(12) United States Patent
Liang et al.

(10) Patent No.: US 8,537,486 B2
(45) Date of Patent: Sep. 17, 2013

(54) DISK DRIVE WRITING SPIRAL TRACKS ON A SLAVE SURFACE USING REPEATABLE RUNOUT COMPENSATION FOR A MASTER SURFACE

(75) Inventors: Jiangang Liang, San Jose, CA (US); Siri S. Weerasooriya, Campbell, CA (US); Yun Hong, San Jose, CA (US); Yilin Cai, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 225 days.

(21) Appl. No.: 13/207,332

(22) Filed: Aug. 10, 2011

(65) Prior Publication Data

US 2013/0038959 A1 Feb. 14, 2013

(51) Int. Cl.
*G11B 5/02* (2006.01)

(52) U.S. Cl.
USPC .......................................................... 360/55

(58) Field of Classification Search
None
See application file for complete search history.

(56) References Cited

U.S. PATENT DOCUMENTS

| | | | |
|---|---|---|---|
| 4,107,746 A | 8/1978 | Conway | |
| 5,668,679 A | 9/1997 | Swearingen et al. | |
| 5,815,485 A | 9/1998 | Tanaka et al. | |
| 6,091,564 A | 7/2000 | Codilian et al. | |
| 6,344,942 B1 | 2/2002 | Yarmchuk | |
| 6,411,459 B1 | 6/2002 | Belser et al. | |
| 6,519,107 B1 | 2/2003 | Ehrlich et al. | |
| 6,631,046 B2 | 10/2003 | Szita et al. | |
| 6,654,198 B2 * | 11/2003 | Liu et al. | 360/77.04 |
| 6,934,112 B2 | 8/2005 | Ono et al. | |
| 6,954,318 B2 | 10/2005 | Sato et al. | |
| 6,965,489 B1 * | 11/2005 | Lee et al. | 360/75 |
| 6,977,791 B2 | 12/2005 | Zhu et al. | |
| 6,992,848 B1 * | 1/2006 | Agarwal et al. | 360/75 |
| 7,016,132 B2 | 3/2006 | Sato et al. | |
| 7,057,842 B2 | 6/2006 | Chung et al. | |
| 7,088,533 B1 * | 8/2006 | Shepherd et al. | 360/51 |
| 7,113,362 B1 | 9/2006 | Lee et al. | |
| 7,116,511 B2 | 10/2006 | Ehrlich | |
| 7,123,433 B1 * | 10/2006 | Melrose et al. | 360/77.04 |
| 7,133,233 B1 | 11/2006 | Ray et al. | |
| 7,133,239 B1 | 11/2006 | Hartman et al. | |
| 7,133,240 B2 | 11/2006 | Ehrlich et al. | |
| 7,139,144 B1 | 11/2006 | Hartman et al. | |
| 7,158,330 B2 | 1/2007 | Morris et al. | |
| 7,206,157 B2 | 4/2007 | Ehrlich | |
| 7,212,369 B1 | 5/2007 | Levy et al | |
| 7,230,786 B1 * | 6/2007 | Ray et al. | 360/75 |
| 7,230,789 B1 | 6/2007 | Brunnett et al. | |
| 7,301,717 B1 | 11/2007 | Lee et al. | |
| 7,307,807 B1 | 12/2007 | Han et al. | |
| 7,312,943 B2 | 12/2007 | Lau et al. | |
| 7,333,286 B2 | 2/2008 | Jung et al. | |
| 7,433,143 B1 | 10/2008 | Ying et al. | |
| 7,499,234 B1 | 3/2009 | Rigney et al. | |
| 7,505,223 B1 | 3/2009 | McCornack | |

(Continued)

*Primary Examiner* — Peter Vincent Agustin (57) ABSTRACT

A method is disclosed of servo writing a disk drive comprising a first head actuated over a first disk surface, and a second head actuated over a second disk surface. A first repeatable runout (RRO) of the first disk surface is measured, and a seek is performed to seek the first head over the first disk surface in response to the measured first RRO while writing a first spiral track to the second disk surface using the second head. As a result, the first spiral track comprises a second RRO that substantially matches the first RRO of the first disk surface.

16 Claims, 8 Drawing Sheets

(56) References Cited

U.S. PATENT DOCUMENTS

| | | |
|---|---|---|
| 7,561,359 B1 | 7/2009 | Jeong et al. |
| 7,623,313 B1 * | 11/2009 | Liikanen et al. ............... 360/75 |
| 7,646,559 B1 * | 1/2010 | Cheung et al. ................ 360/75 |
| 7,688,542 B2 | 3/2010 | Chan et al. |
| 7,764,457 B1 * | 7/2010 | Neos et al. .................... 360/75 |
| 7,773,334 B1 * | 8/2010 | Rutherford .................... 360/75 |
| 7,839,591 B1 | 11/2010 | Weerasooriya et al. |
| 7,843,662 B1 | 11/2010 | Weerasooriya et al. |
| 2002/0039248 A1 * | 4/2002 | Liu et al. .................... 360/77.04 |
| 2003/0086196 A1 | 5/2003 | Morris et al. |
| 2003/0099050 A1 | 5/2003 | Kitagawa |
| 2004/0160696 A1 | 8/2004 | Meyer |
| 2004/0264032 A1 * | 12/2004 | Baum et al. ................ 360/77.04 |
| 2007/0047132 A1 | 3/2007 | Sado et al. |
| 2007/0081268 A1 | 4/2007 | Jung et al. |
| 2007/0195450 A1 | 8/2007 | Rutherford |
| 2007/0211367 A1 | 9/2007 | Lau et al. |
| 2007/0211369 A1 | 9/2007 | Yang et al. |
| 2008/0002279 A1 | 1/2008 | Kouhara et al. |
| 2008/0239556 A1 | 10/2008 | Wiseman et al. |
| 2009/0086357 A1 | 4/2009 | Ehrlich |
| 2013/0038959 A1 * | 2/2013 | Liang et al. .................... 360/31 |

* cited by examiner

DISK DRIVE WRITING SPIRAL TRACKS ON A SLAVE SURFACE USING REPEATABLE RUNOUT COMPENSATION FOR A MASTER SURFACE

BACKGROUND

Figure 1:
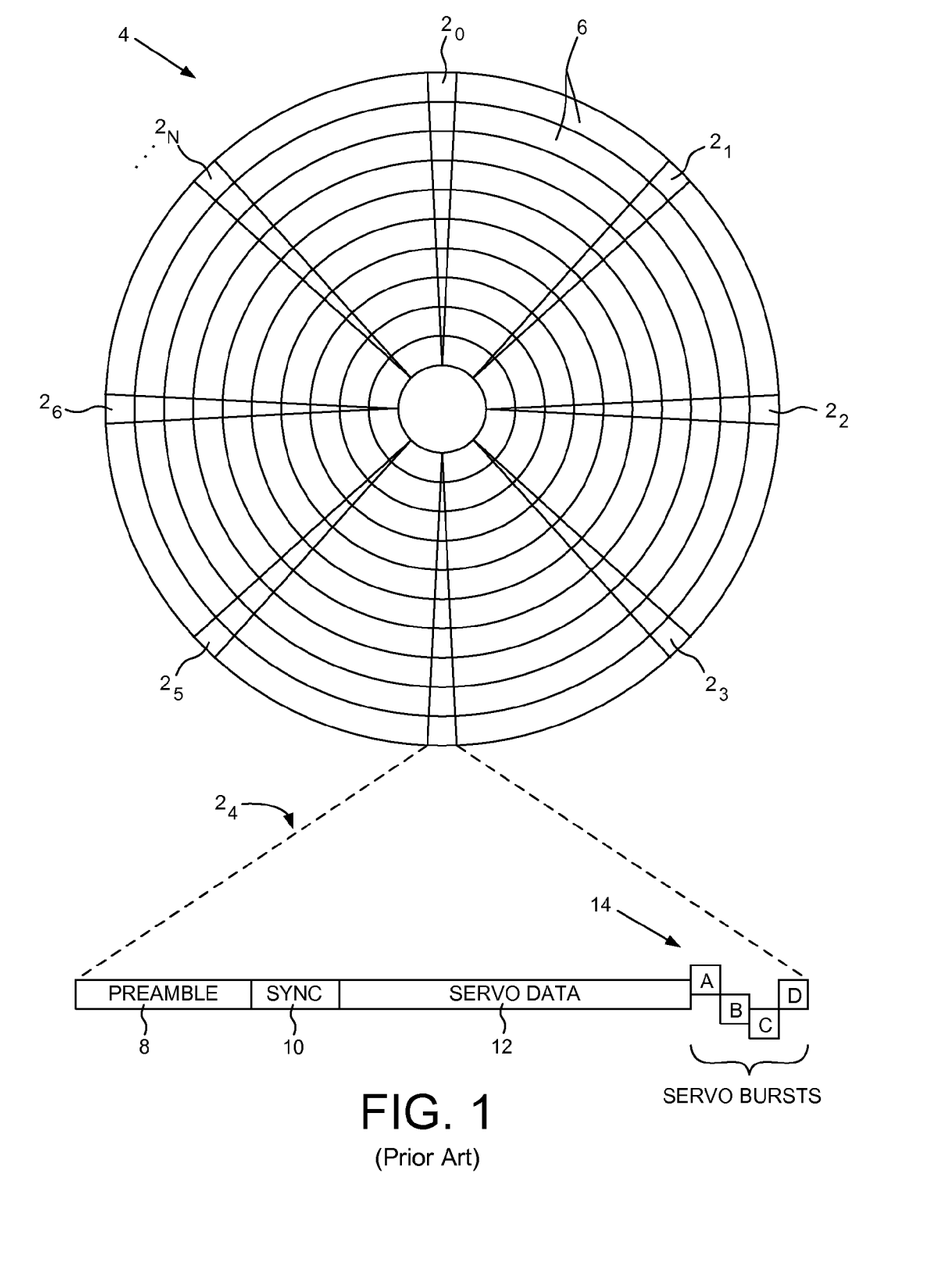
FIG. 1 shows a prior art disk format comprising a plurality of tracks defined by servo sectors.

When manufacturing a disk drive, concentric servo sectors $2_0\text{-}2_N$ are written to a disk 4 which define a plurality of radially-spaced, concentric data tracks 6 as shown in the prior art disk format of FIG. 1. Each data track 6 is partitioned into a plurality of data sectors wherein the concentric servo sectors $2_0\text{-}2_N$ are considered "embedded" in the data sectors. Each servo sector (e.g., servo sector $2_4$) comprises a preamble 8 for synchronizing gain control and timing recovery, a sync mark 10 for synchronizing to a data field 12 comprising coarse head positioning information such as a track number, and servo bursts 14 which provide fine head positioning information. The coarse head position information is processed to position a head over a target track during a seek operation, and the servo bursts 14 are processed to maintain the head over a centerline of the target track while writing or reading data during a tracking operation.

In the past, external servo writers have been used to write the concentric servo sectors $2_0\text{-}2_N$ to the disk surface during manufacturing. External servo writers employ extremely accurate head positioning mechanics, such as a laser interferometer, to ensure the concentric servo sectors $2_0\text{-}2_N$ are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various "self-servo" writing methods wherein the internal electronics of the disk drive are used to write the concentric servo sectors independent of an external servo writer. For example, U.S. Pat. No. 5,668,679 teaches a disk drive which performs a self-servo writing operation by writing a plurality of spiral servo tracks to the disk which are then processed to write the concentric servo sectors along a circular path. Each spiral servo track is written to the disk as a high frequency signal (with missing bits), wherein the position error signal (PES) for tracking is generated relative to time shifts in the detected location of the spiral servo tracks. The read signal is rectified and low pass filtered to generate a triangular envelope signal representing a spiral servo track crossing, wherein the location of the spiral servo track is detected by detecting a peak in the triangular envelope signal relative to a clock synchronized to the rotation of the disk.

DETAILED DESCRIPTION OF EMBODIMENTS OF THE INVENTION

Figure 2A:
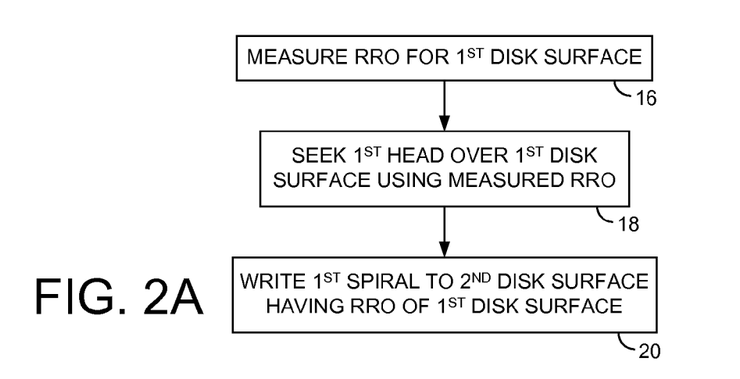
FIG. 2A is a flow diagram according to an embodiment of the present invention wherein a repeatable runout (RRO) is measured for a first disk surface and used to write a spiral track on a second disk surface.

FIG. 2A shows a method of servo writing a disk drive according to an embodiment of the present invention, wherein the disk drive comprises a first head actuated over a first disk surface, and a second head actuated over a second disk surface. A first repeatable runout (RRO) of the first disk surface is measured (step 16), and a seek is performed to seek the first head over the first disk surface in response to the measured first RRO (step 18) while writing a first spiral track to the second disk surface using the second head (step 20), wherein the first spiral track comprises a high frequency signal interrupted by sync marks, and the first spiral track comprises a second RRO that substantially matches the first RRO of the first disk surface.

Figure 2B:
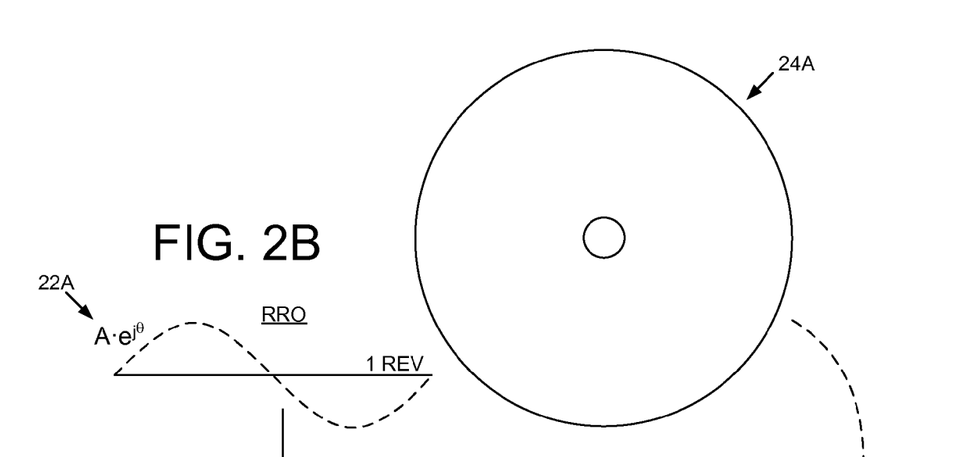
FIGS. 2B and 2C illustrate the RRO measured for the first disk surface is mirrored in a spiral track written to a second disk surface while servoing on the first disk surface according to an embodiment of the present invention.

FIG. 2B shows a first RRO 22A measured for a first disk surface 24A as comprising a sinusoid having a period equal to one revolution of the disk. The RRO is typically caused by a non-centric alignment of the disk with respect to the center of a spindle motor hub that rotates the disk. When multiple disks are clamped to the spindle motor, each disk center may have a different non-centric alignment with the center of the spindle motor hub. In one embodiment, a plurality of spiral tracks are written to a second disk surface while servoing on the first disk surface, wherein the spiral tracks are used to servo write concentric servo sectors on the second disk surface. In order to align the concentric servo sectors of both the first and second surfaces, the first RRO 22A of the first disk surface 24A shown in FIG. 2B is used to write a first spiral track $28_0$ to the second disk surface 24B shown in FIG. 2C. As a result, the first spiral track $28_0$ comprises a second RRO 22B that substantially matches the first RRO 22A of the first disk surface 24A, even though the RRO of the second disk surface may be different than the RRO of the first disk surface.

Figure 3A:
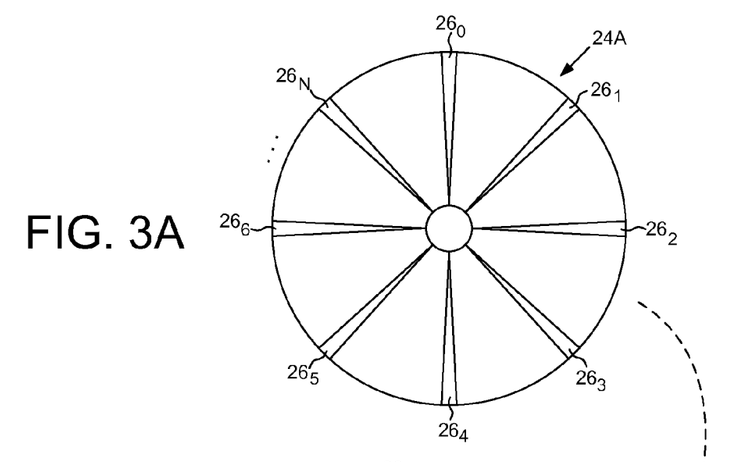
FIG. 3A shows an embodiment of the present invention wherein the first disk surface comprises concentric servo sectors for servoing the first head over the first disk surface while writing a plurality of spiral tracks to a second disk surface.

In an embodiment illustrated in FIG. 3A, a media writer is used to write a plurality of concentric servo sectors $26_0$-$26_N$ to the first disk surface 24A of a first disk. The first disk and at least one other blank disk are then clamped to the spindle motor hub of a disk drive, wherein each disk may exhibit a different RRO based on the non-centric alignment with the spindle motor hub. Control circuitry within the disk drive servos a first head over the first disk surface 24A by reading the concentric servo sectors $26_0$-$26_N$, and measures the first RRO of the first disk surface 22A by measuring the amplitude and phase of a sinusoidal disturbance in the position error signal (PES) used to servo the head in response to the servo sectors $26_0$-$26_N$. In an embodiment described below, the first RRO is learned by adjusting the amplitude and phase of sinusoidal feedforward compensation until the PES falls below a threshold. The resulting sinusoidal feedforward compensation represent the first RRO of the first disk surface.

Figure 2C:
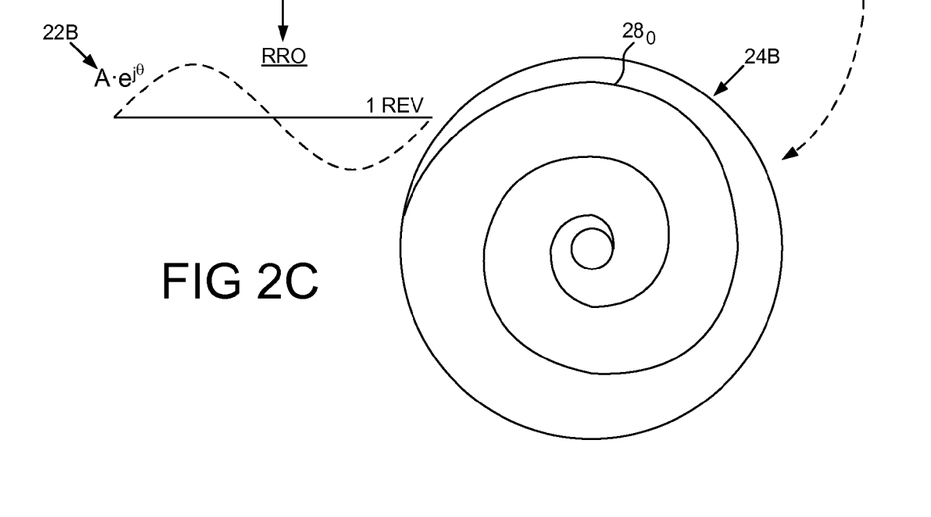
Figure 3B:
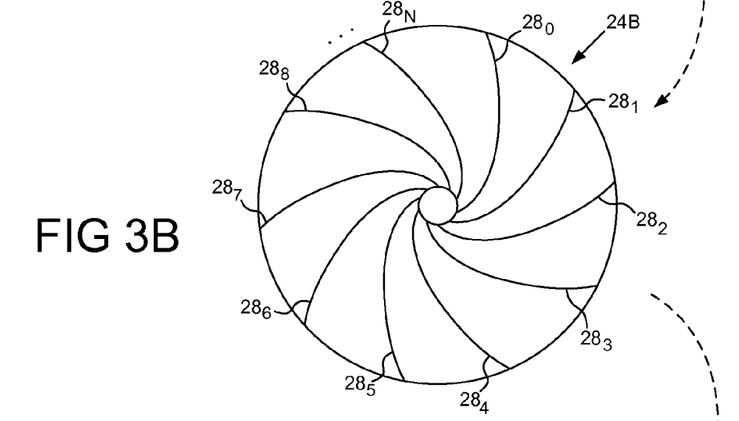
FIG. 3B shows the plurality of spiral tracks written to the second disk surface while servoing on the first disk surface according to an embodiment of the present invention.

After measuring the first RRO of the first disk surface, the control circuitry seeks the first head over the first disk surface at a substantially constant velocity using the sinusoidal feedforward compensation while writing a spiral track 28, to the second disk surface 24B using the second head. The control circuitry performs multiple seeks in order to write a plurality of spiral tracks $28_0$-$28_N$ to the second disk surface 24B as illustrated in FIG. 3B. Each spiral track 28, is written over a partial disk revolution in the embodiment of FIG. 3B, but may be written over multiple disk revolutions as shown in the embodiment of FIG. 2C. The resulting spiral tracks $28_0$-$28_N$ will comprise an RRO that substantially matches the RRO of the first disk surface.

Figure 3C:
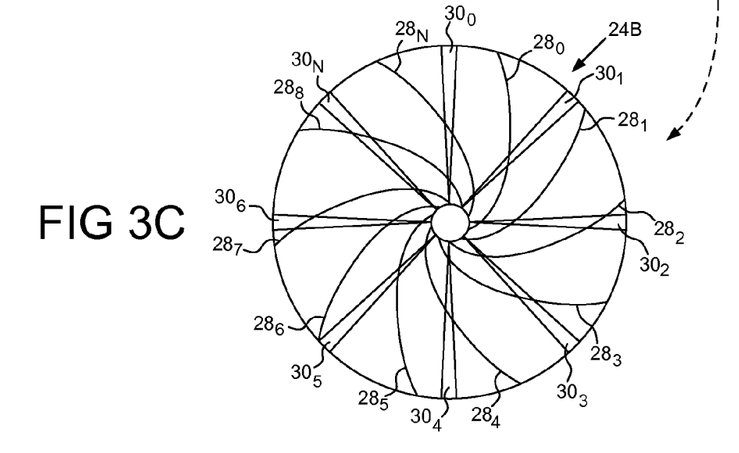
FIG. 3C shows an embodiment of the present invention wherein concentric servo sectors are written to the second disk surface while servoing on the spiral tracks on the second disk surface.

After the spiral tracks $28_0$-$28_N$ are written to the second disk surface, the control circuitry servos on the spiral tracks while writing concentric servo sectors $30_0$-$30_N$ to the second disk surface 24B as illustrated in FIG. 3C. Since the RRO of the spiral tracks $28_0$-$28_N$ substantially matches the RRO of the first disk surface, the same sinusoidal feedforward compensation values used to write the spiral tracks $28_0$-$28_N$ can be used to write the concentric servo sectors $30_0$-$30_N$ on the second disk surface 24B. As a result, the concentric servo sectors $30_0$-$30_N$ on the second disk surface 24B will align radially with the concentric servo sectors $26_0$-$26_N$ on the first disk surface 24A. In this manner, the servo tracks (and data tracks) of the second disk surface 24B will align radially with the servo tracks (and data tracks) of the first disk surface 24A.

Figure 4A:
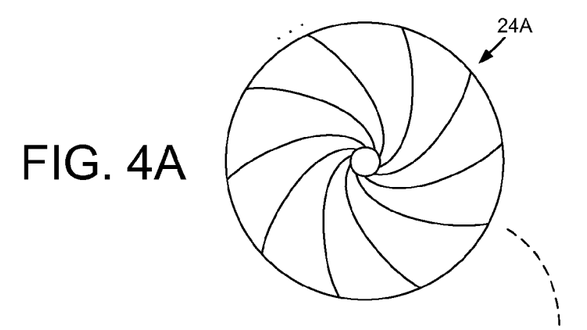
FIGS. 4A-4D illustrate an embodiment of the present invention wherein a plurality of spiral tracks are written on the first disk surface, the first disk surface is written with concentric servo sectors by servoing on the spiral tracks, and then spiral tracks are written to the second disk surface.
Figure 4B:
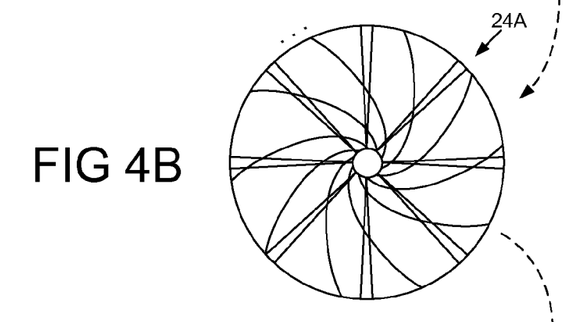
Figure 4C:
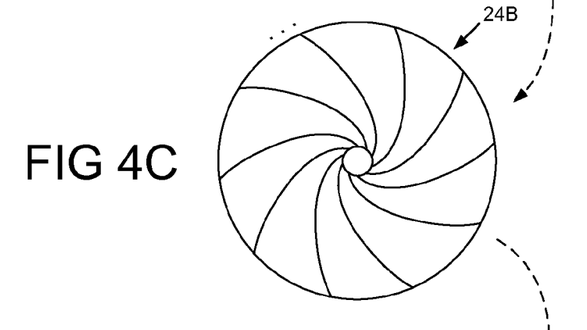
Figure 4D:
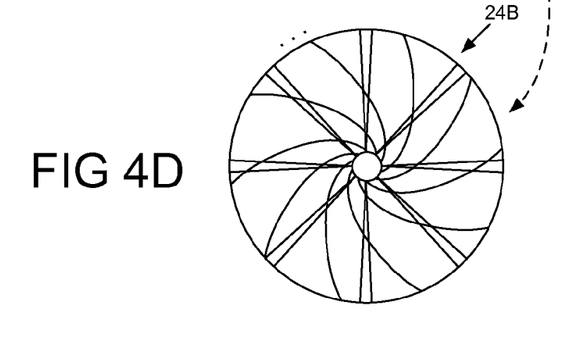

FIGS. 4A-4D illustrate an alternative embodiment of the present invention wherein a media writer is used to write a plurality of spiral tracks to the first disk surface 24A of a first disk, and then the first disk together with at least one blank disk are clamped to a spindle motor hub of a disk drive. The control circuitry then servos on the spiral tracks of the first disk surface 24A in order to write a plurality of concentric servo sectors to the first disk surface 24A as shown in FIG. 4B. The first RRO of the first disk surface 24A is then measured in response to the concentric servo sectors written on the first disk surface 24A, and used to write spiral tracks to the second disk surface 24B as shown in FIG. 4C. The control circuitry then servos on the spiral tracks of the second disk surface 24B (together with the sinusoidal feedforward compensation values used to write the spiral tracks on the second disk surface 24B) in order to write a plurality of concentric servo sectors to the second disk surface 24B as shown in FIG. 4D.

Figure 5A:
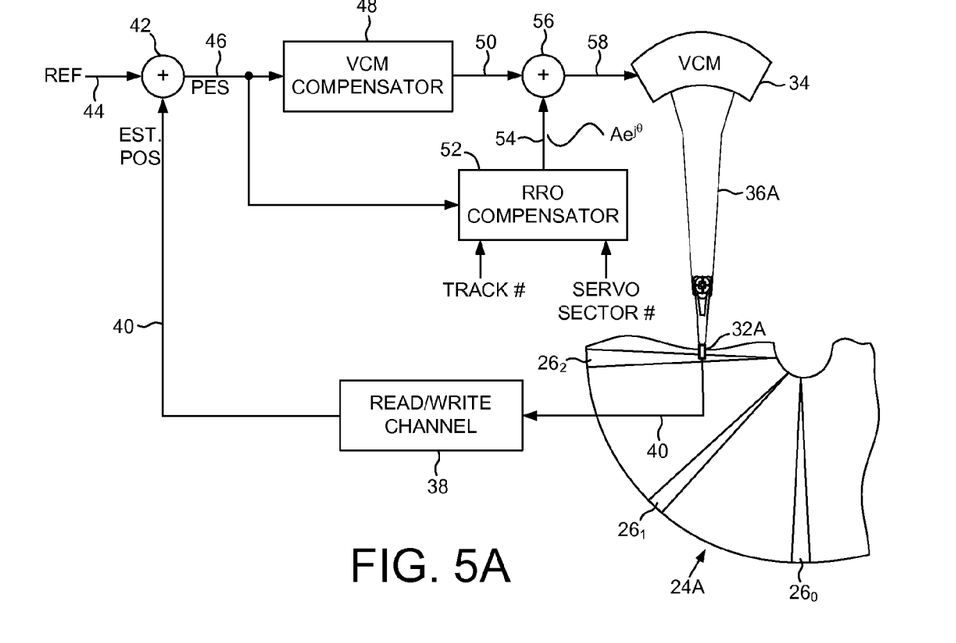
FIG. 5A shows control circuitry according to an embodiment of the present invention for servoing a first head over the first disk surface while writing spiral tracks to the second disk surface.

FIG. 5A shows a disk drive according to an embodiment of the present invention comprising the first head 32A actuated over the first disk surface 24A by a voice coil motor (VCM) 34 that rotates an actuator arm 36A about a pivot. The disk drive comprises control circuitry, including a read/write channel 38 for processing a read signal 40 emanating from the first head 32A as it reads the concentric servo sectors $26_0$-$26_N$. The read/write channel 38 generates an estimated position 40 representing an estimated radial location of the first head 32A over the first disk surface 24A. The estimated position 40 is subtracted 42 from a reference position 44 (e.g., a target radial location) to generate a position error signal (PES) 46. The PES 46 is filtered with a suitable VCM compensator 48 to generate a control signal 50 used to servo the first head 32A over the first disk surface 24A.

When learning the first RRO of the first disk surface 24A, an RRO compensator 52 measures the corresponding sinusoidal disturbance in the PES 46. In one embodiment, the RRO compensator 52 adjusts the amplitude A and phase θ of a sinusoidal feedforward compensation $Ae^{j\theta}$ 54 having an angular frequency of $2\pi k/N$ where k is a current servo sector out of N servo sectors. The sinusoidal feedforward compensation $Ae^{j\theta}$ 54 is added 56 to the control signal 50 to generate a compensated control signal 58 applied to the VCM 34. The amplitude and phase of the sinusoidal feedforward compensation $Ae^{j\theta}$ 54 is adjusted until the PES is substantially zero (except for the affect of non-repeatable disturbances or higher harmonic RRO). In one embodiment, a feedforward compensation value is generated for each of the concentric servo sectors $26_0$-$26_N$ and optionally for each track or zone of tracks.

Figure 5B:
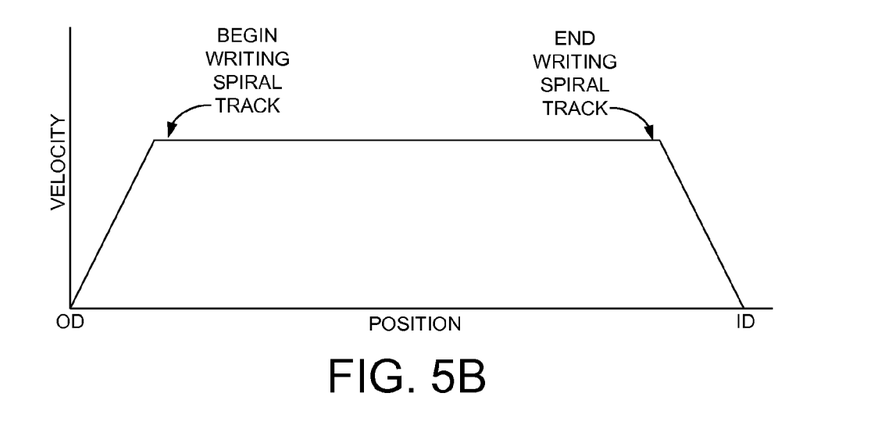
FIG. 5B shows a velocity profile for writing the spiral tracks to the second disk surface according to an embodiment of the present invention.

In one embodiment, the control circuitry writes the spiral tracks to the second disk surface 24B by seeking the first head 32A over the first disk surface 24A using a velocity profile, an example of which is shown in FIG. 5B. The velocity profile comprises an acceleration segment, a constant velocity segment, and a deceleration segment. In the embodiment of FIG. 5B, the control circuitry writes a spiral track to the second disk surface 24B during the constant velocity segment of the velocity profile so that the spiral track comprises a substantially constant slope across the radius of the disk. When seeking the first head 32A over the first disk surface 24A, the RRO of the first disk surface 24A is a disturbance to the states of the servo system (e.g., position, velocity, etc.). In one embodiment, the sinusoidal feedforward compensation $Ae^{j\theta}$ 54 shown in FIG. 5A compensate for the RRO disturbance so that the first head 32A moves at a substantially constant velocity relative to the first disk surface 24A, thereby moving the second head 32B (FIG. 7A) over the second disk surface 24B at a substantially constant velocity relative to the first disk surface 24A (i.e., relative to the RRO of the first disk surface 24A).

Figure 6:
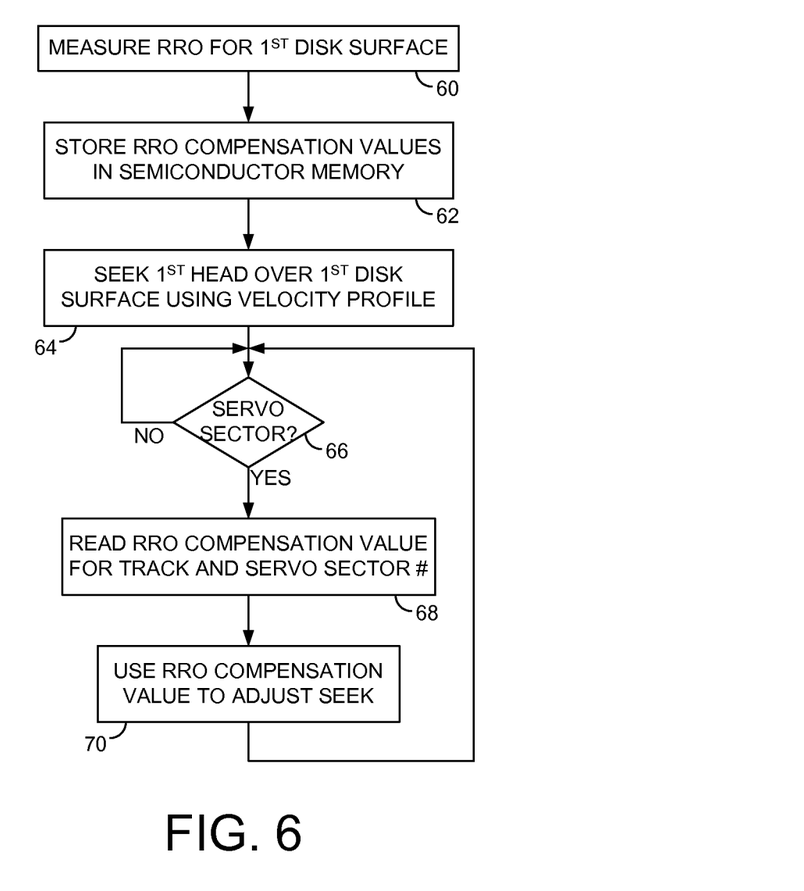
FIG. 6 is a flow diagram according to an embodiment of the present invention wherein feedforward RRO compensation values are stored in memory and then applied to the servo system while writing a spiral track to the second disk surface.

FIG. 6 shows a flow diagram according to an embodiment of the present invention wherein the RRO of the first disk surface 24A changes relative to the radial location of the first head 32A. Accordingly, the RRO of the first disk surface is measured at a plurality of radial locations (step 60) and corresponding RRO compensation values stored in a semiconductor memory (step 62). The control circuitry then seeks the first head over the first disk surface (step 64) using a velocity profile (e.g., FIG. 5B). When the first head reaches a servo sector (step 66), the RRO compensation value corresponding to the servo sector and radial location of the head is read from the semiconductor memory (step 68) and used to adjust the seek (step 70) such as by adding a sinusoidal feedforward compensation $Ae^{j\theta}$ to the VCM control signal as described above.

Figures 7A, 7B:
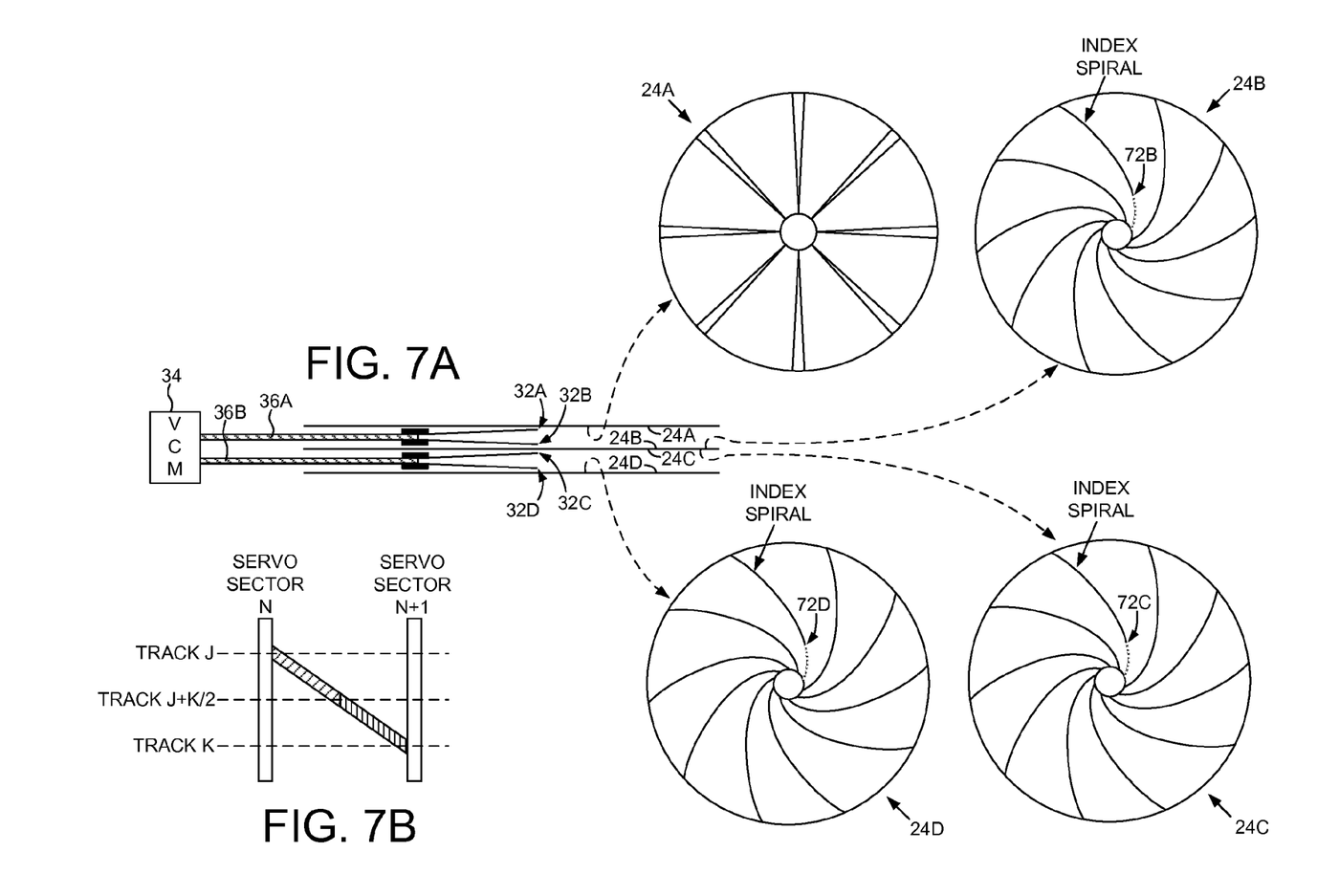
FIGS. 7A and 7B show an embodiment of the present invention wherein a seam is written in an index spiral track on each disk surface that is written with spiral tracks.

FIG. 7A illustrates an embodiment of the present invention wherein the disk drive comprises a plurality of disk surfaces 24A-24D and respective heads 32A-32D actuated over each disk surface. In one embodiment, the control circuitry seeks the first head 32A over the first disk surface 24A while simultaneously writing a first spiral track to the second disk surface 24B and a second spiral track to the third disk surface 24C (and optionally writing a third spiral track to the fourth disk surface 24D). That is, the spiral tracks may be written to the disk surfaces using a bank write operation, whereas in an alternative embodiment, the spiral tracks may be written to each disk surface using separate write operations.

FIG. 7A illustrates another embodiment of the present invention wherein when the first head 32A reaches a target circumferential and radial location during the seek to write an index spiral track to each disk surface (bank write or individually write), a seam 72B-72D is written in the index spiral tracks on each disk surface. The seam 72B-72D may be written in any suitable manner, such as by writing a gap in each index spiral track. In an embodiment shown on FIG. 7B, the seam 72B-72D is written in each index spiral track by switching a sync mark in the spiral track. The seam is detectable by detecting the change in sync marks as the head moves radially over the disk (e.g., using correlators matched to each sync mark). In the embodiment of FIG. 7B, the seam is written in the index spiral tracks when the first head 32A is halfway between consecutive servo sectors N and N+1 during the seek. In this manner, the track where the seam is written can be estimated as track J+K/2, where track J corresponds to servo sector N and track J+K corresponds to servo sector N+1 as illustrated in FIG. 7B.

Figure 7C:
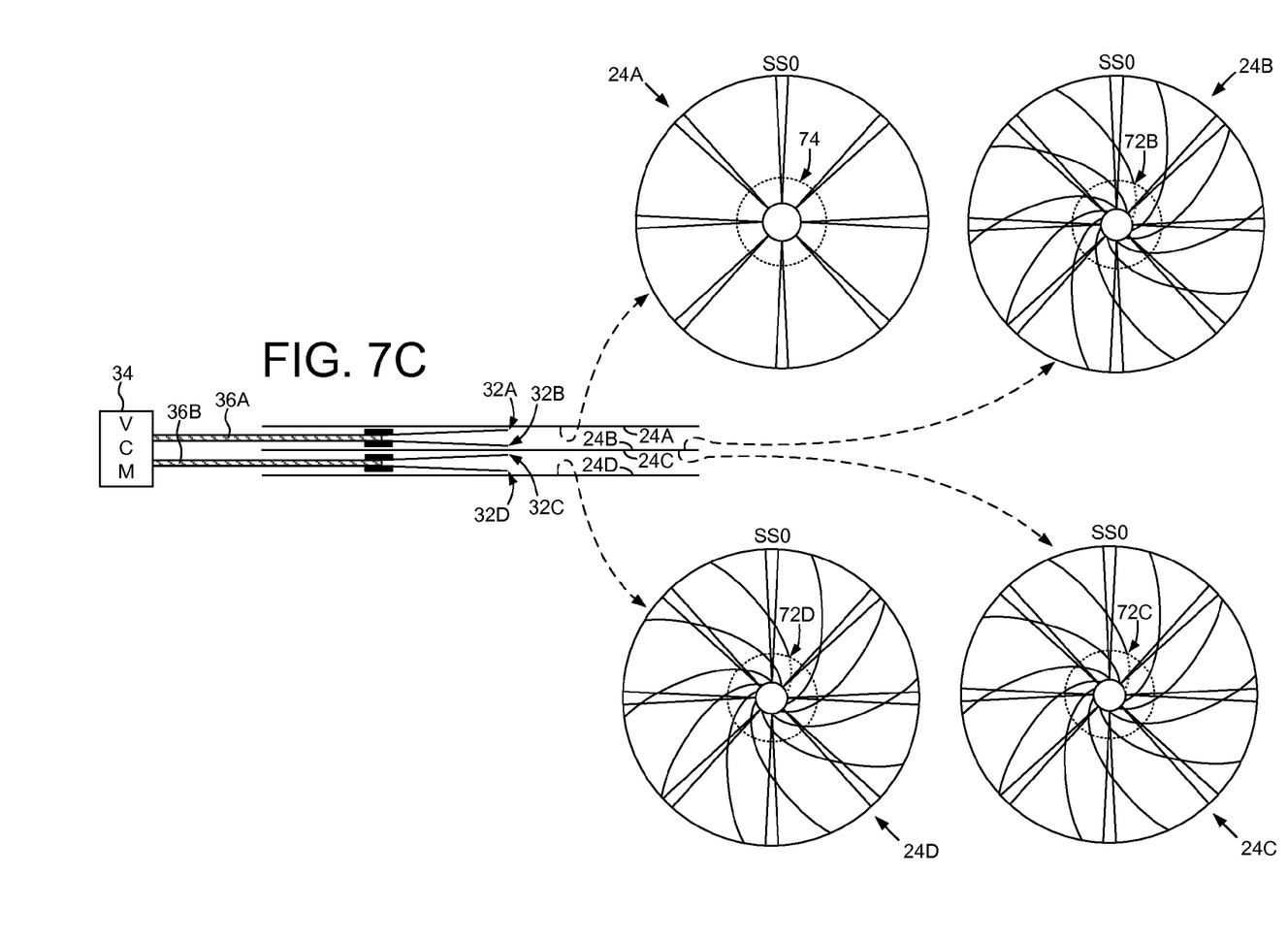
FIG. 7C illustrates an embodiment of the present invention wherein the seam in the index spiral tracks is used to align the disk surfaces radially and circumferentially when servo writing the concentric servo sectors by servoing on the spiral tracks.

FIG. 7C illustrates an embodiment of the present invention wherein after writing spiral tracks to disk surfaces 24B-24D, including an index spiral track comprising a seam 72B-72D, concentric servo sectors are written to each disk surface by servoing on the spiral tracks. Prior to writing the concentric servo sectors to one of the disk surfaces, the seam in the index spiral track is located in order to initialize the radial and circumferential location of the head. The concentric servo sectors are then written so as to align radially and circumferentially with the other disk surfaces. This is illustrated in FIG. 7C where the servo sectors are aligned circumferentially across the disk surfaces, including an index servo sector SS0. In addition, the concentric servo sectors are written on each disk surface such that the track 74 on the first disk surface 24A corresponding to when the seam 72B-72D was written (track J+K/2 in FIG. 7B) is the same track across the disk surfaces (i.e., the concentric servo sectors and resulting servo tracks are aligned radially across the disk surfaces).

In one embodiment, aligning the concentric servo sectors radially and circumferentially across the disk surfaces improves performance in accessing the disk surfaces. For example, aligning the concentric servo sectors may enable a rotational position optimization (RPO) algorithm to estimate the time needed to access a target data sector of a target track on a second disk surface after completing an access command on a first disk surface. Alternatively, aligning the concentric servo sectors may improve performance when executing an access command (write or read) that spans multiple disk surfaces by minimizing the latency after the head switch.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a first disk surface;
   a second disk surface;
   a first head actuated over the first disk surface;
   a second head actuated over the second disk surface; and
   control circuitry operable to:
      measure a first repeatable runout (RRO) of the first disk surface; and
      seek the first head over the first disk surface in response to the measured first RRO while writing a first spiral track to the second disk surface using the second head, wherein:
         the first spiral track comprises a high frequency signal interrupted by sync marks; and
         the first spiral track comprises a second RRO substantially matching the first RRO of the first disk surface.

2. The disk drive as recited in claim 1, wherein:
   the first disk surface comprises a first plurality of concentric servo sectors; and
   the control circuitry is operable to measure the first RRO for the first disk surface in response to the concentric servo sectors.

3. The disk drive as recited in claim 2, wherein the control circuitry is further operable to:
   generate a RRO compensation value for each servo sector in response to the measured first RRO at a plurality of radial locations;
   seek the first head over the first disk surface in response to the servo sectors and a target RRO compensation value corresponding to a current servo sector and radial location of the head during the seek.

4. The disk drive as recited in claim 3, wherein the control circuitry is further operable to:
   save the RRO compensation values in a semiconductor memory; and
   read the target RRO compensation value from the semiconductor memory corresponding to the current servo sector and radial location of the head during the seek.

5. The disk drive as recited in claim 2, further comprising a third disk surface and a third head actuated over the third disk surface, wherein the control circuitry is further operable to simultaneously write a second spiral track to the third disk surface using the third head while writing the first spiral track to the second disk surface.

6. The disk drive as recited in claim 2, further comprising a third disk surface and a third head actuated over the third disk surface, wherein the control circuitry is further operable to:

write a second spiral track to the third disk surface using the third head; and write a seam in the first and second spiral tracks at substantially the same radial and circumferential location.

7. The disk drive as recited in claim 6, wherein the control circuitry is further operable to:

write a second plurality of concentric servo sectors to the second disk surface in response to the first spiral track and the seam in the first spiral track; and write a third plurality of concentric servo sectors to the third disk surface in response to the second spiral track and the seam in the second spiral track;

process the seam in the first and second spiral tracks to cause the second plurality of concentric servo sectors to substantially align with the third plurality of concentric servo sectors radially and circumferentially.

8. The disk drive as recited in claim 7, wherein the first, second, and third plurality of concentric servo sectors substantially align radially and circumferentially.

9. A method of servo writing a disk drive comprising a first head actuated over a first disk surface, and a second head actuated over a second disk surface, the method comprising:

measuring a first repeatable runout (RRO) of the first disk surface; and seeking the first head over the first disk surface in response to the measured first RRO while writing a first spiral track to the second disk surface using the second head, wherein:

the first spiral track comprises a high frequency signal interrupted by sync marks; and the first spiral track comprises a second RRO substantially matching the first RRO of the first disk surface.

10. The method as recited in claim 9, wherein:

the first disk surface comprises a first plurality of concentric servo sectors; and the method further comprises measuring the first RRO for the first disk surface in response to the concentric servo sectors.

11. The method as recited in claim 10, further comprising:

generating a RRO compensation value for each servo sector in response to the measured first RRO at a plurality of radial locations;

seeking the first head over the first disk surface in response to the servo sectors and a target RRO compensation value corresponding to a current servo sector and radial location of the head during the seek.

12. The method as recited in claim 11, further comprising:

saving the RRO compensation values in a semiconductor memory; and reading the target RRO compensation value from the semiconductor memory corresponding to the current servo sector and radial location of the head during the seek.

13. The method as recited in claim 10, wherein the disk drive further comprises a third a third head actuated over a third disk surface, further comprising simultaneously writing a second spiral track to the third disk surface using the third head while writing the first spiral track to the second disk surface.

14. The method as recited in claim 10, wherein the disk drive further comprises a third disk surface and a third head actuated over the third disk surface, the method further comprising:

writing a second spiral track to the third disk surface using the third head; and writing a seam in the first and second spiral tracks at substantially the same radial and circumferential location.

15. The method as recited in claim 14, further comprising:

writing a second plurality of concentric servo sectors to the second disk surface in response to the first spiral track and the seam in the first spiral track; and writing a third plurality of concentric servo sectors to the third disk surface in response to the second spiral track and the seam in the second spiral track;

processing the seam in the first and second spiral tracks to cause the second plurality of concentric servo sectors to substantially align with the third plurality of concentric servo sectors radially and circumferentially.

16. The method as recited in claim 15, wherein the first, second, and third plurality of concentric servo sectors substantially align radially and circumferentially.

* * * * *